(12) United States Patent
Capolunghi et al.

(10) Patent No.: US 7,826,647 B2
(45) Date of Patent: Nov. 2, 2010

(54) METHODS AND SYSTEMS FOR ITERATIVELY IDENTIFYING VASCULAR STRUCTURE

(75) Inventors: Renaud Capolunghi, Vanves (FR); Laurent Launay, Saint Rémy lès Chevreuse (FR); Laurent Stefani, Paris (FR); Ruben Laramontalvo, Paris (FR)

(73) Assignee: General Electric Company, Schenectady, NY (US)

( * ) Notice: Subject to any disclaimer, the term of this patent is extended or adjusted under 35 U.S.C. 154(b) by 1074 days.

(21) Appl. No.: 11/301,950

(22) Filed: Dec. 13, 2005

(65) Prior Publication Data

US 2007/0118024 A1   May 24, 2007

Related U.S. Application Data

(60) Provisional application No. 60/739,691, filed on Nov. 23, 2005.

(51) Int. Cl.
*G06K 9/00* (2006.01)
(52) U.S. Cl. .................................................. 382/128
(58) Field of Classification Search ......... 382/128–134; 128/920–930; 250/455–465; 356/39–49
See application file for complete search history.

(56) References Cited

U.S. PATENT DOCUMENTS

| 2003/0031351 | A1* | 2/2003 | Yim ........................... 382/130 |
| 2005/0110791 | A1* | 5/2005 | Krishnamoorthy et al. .. 345/419 |
| 2006/0211940 | A1* | 9/2006 | Antonelli et al. ............ 600/410 |

* cited by examiner

*Primary Examiner*—Samir A. Ahmed
*Assistant Examiner*—Atiba O Fitzpatrick
(74) *Attorney, Agent, or Firm*—McAndrews, Held & Malloy, Ltd.; Michael A. Dellapenna

(57) ABSTRACT

Certain embodiments of the present invention provide a method for identifying vascular structure in an image including: receiving at least one image including a vascular network; identifying at least one seed point corresponding to the vascular network; identifying automatically at least a portion of the vascular network to form an original vascular identification based at least in part on the at least one seed point; and allowing a dynamic user interaction with the vascular identification to form an iterative vascular identification. In an embodiment, the iterative vascular identification is formable in real-time. In an embodiment, the iterative vascular identification is displayable in real-time. In an embodiment, the iterative vascular identification is formable without re-identifying substantially unaltered portions of the vascular identification.

10 Claims, 10 Drawing Sheets

METHODS AND SYSTEMS FOR ITERATIVELY IDENTIFYING VASCULAR STRUCTURE

This application claims the benefit of U.S. provisional patent application No. 60/739,691, filed Nov. 23, 2005.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Embodiments of the present application relate generally to analysis of radiological images having vascular structure. Particularly, certain embodiments relate to workflow for dynamic vascular structure identification.

Clinicians may wish to analyze, survey, or diagnose a patient's circulatory system. Radiological imaging systems may provide graphical information in two-dimensional, three-dimensional, or four-dimensional corresponding to a patient's circulatory system. However, the images by themselves may not provide the clinician with a clear picture of the patient's circulatory system. In order to further assist a clinician, it may be useful to process radiological images to identify structure corresponding to a patient's circulatory system. In particular, it may be helpful to identify vascular structure in a patient.

Existing tools may be capable of identifying a patient's vascular structure. For example, General Electric Company's Advanced Vessel Analysis (AVA) may provide a package of analysis tools which aid clinicians in surgical planning, vessel disease progression and stent planning. A clinician using AVA may select a vessel for analysis. AVA may then automatically identify key aspects of the selected vessel, such as centerline of the vessel (e.g., center of vessel) and cross-section of the vessel. Analysis performed by AVA may be in a variety of formats for review, transfer, or storage.

Vascular structure identification may consume substantial processing resources. For example, a patient's vascular structure of interest may be a relatively complicated three or four dimensional shape or set of shapes. To identify an entire vascular tree of interest may consume substantial processing resources, including memory, processor availability, and processing speed, for example. In addition, vascular structure identification may also require a clinician's time.

Vascular structure identification may be an iterative process. A first try may not adequately identify vascular structure, and a clinician may need to make a series of subsequent iterations to arrive at a clinically satisfactory identification. It may be helpful for clinicians to dynamically interact with a vascular identification tool in real-time when making subsequent iterations.

Thus, there is a need for methods and systems that reduce the cost and resource consumption of vascular structure identification. Additionally, there is a need for methods and systems that improve the efficiency of vascular structure identification. Furthermore, there is a need for methods and systems that enable a user's dynamic interaction with vascular structure identification tools in real-time.

BRIEF SUMMARY OF THE INVENTION

Certain embodiments of the present invention provide a method for identifying vascular structure in an image including: receiving at least one image including a vascular network; identifying at least one seed point corresponding to the vascular network; identifying automatically at least a portion of the vascular network to form an original vascular identification based at least in part on the at least one seed point; and allowing a dynamic user interaction with the vascular identification to form an iterative vascular identification. In an embodiment, the iterative vascular identification is formable in real-time. In an embodiment, the iterative vascular identification is displayable in real-time. In an embodiment, the iterative vascular identification is formable without re-identifying substantially unaltered portions of the vascular identification. In an embodiment, the method further includes the user performing additional interactions on the iterative vascular identification. In an embodiment, the user interaction includes selection of a portion of the original vascular identification. In an embodiment, the iterative vascular identification includes at least one of: an extension, an addition, a removal, an alteration, and a bridging. In an embodiment, the user interaction includes adding at least one distal seed point to form at least one of: the extension and the addition. In an embodiment, the alteration results at least in part from the user interaction including at least one of: an alteration of a centerline, an alteration of a cross-section, an addition of an intermediate seed point, a removal of an intermediate seed point, and an alteration of an intermediate seed point.

Certain embodiments of the present invention provide, a computer-readable storage medium including a set of instructions for a computer, the set of instructions including: a reception routine for receiving at least one image including a vascular network; an identification routine for identifying at least one seed point corresponding to the vascular network; an identification routine for identifying automatically at least a portion of the vascular network to form an original vascular identification based at least in part on the at least one seed point; and at least one interaction routine allowing a user interaction with the vascular identification to form an iterative vascular identification. In an embodiment, the iterative vascular identification is formable in real-time. In an embodiment, the iterative vascular identification is displayable in real-time. In an embodiment, the iterative vascular identification is formable without re-identifying unaltered portions of the vascular identification. In an embodiment, the user performs additional interactions on the iterative vascular identification. In an embodiment, the user interaction includes selection of a portion of the original vascular identification. In an embodiment, the at least one interaction routine includes at least one of: an extension routine; an addition routine; a removal routine; an alteration routine; and a bridging routine. In an embodiment, at least one distal seed point is added by the user to execute at least one of: the extension routine; and the addition routine. In an embodiment, the alteration routine is based at least in part from the user interaction including at least one of: an alteration of a centerline; an alteration of a cross-section; an addition of an intermediate seed point; a removal of an intermediate seed point; and an alteration of an intermediate seed point.

Certain embodiments of the present invention provide a method of identifying vascular structure in an image including: identifying automatically at least a portion of the vascular network to form an original vascular identification based at least in part on the at least one seed point; and allowing a user interaction with the vascular identification to form an iterative vascular identification. In an embodiment, the iterative vascular identification is formable in real-time.

Certain embodiments of the present invention provide a system for iterative vascular identification including: data generated by an imaging subsystem including at least a portion of a vascular network; an original vascular identification corresponding substantially to the portion of the vascular network; and a processor for receiving information corresponding to a user interaction with the original vascular identification, and for calculating an iterative vascular identification based at least on the data, the original vascular identification, and the information corresponding to the user interaction, wherein the processor does not substantially re-identify portions of the iterative vascular identification that are substantially similar to corresponding portions of the original vascular identification. In an embodiment, the processor calculates the iterative vascular identification substantially in real-time.

Figure 1:
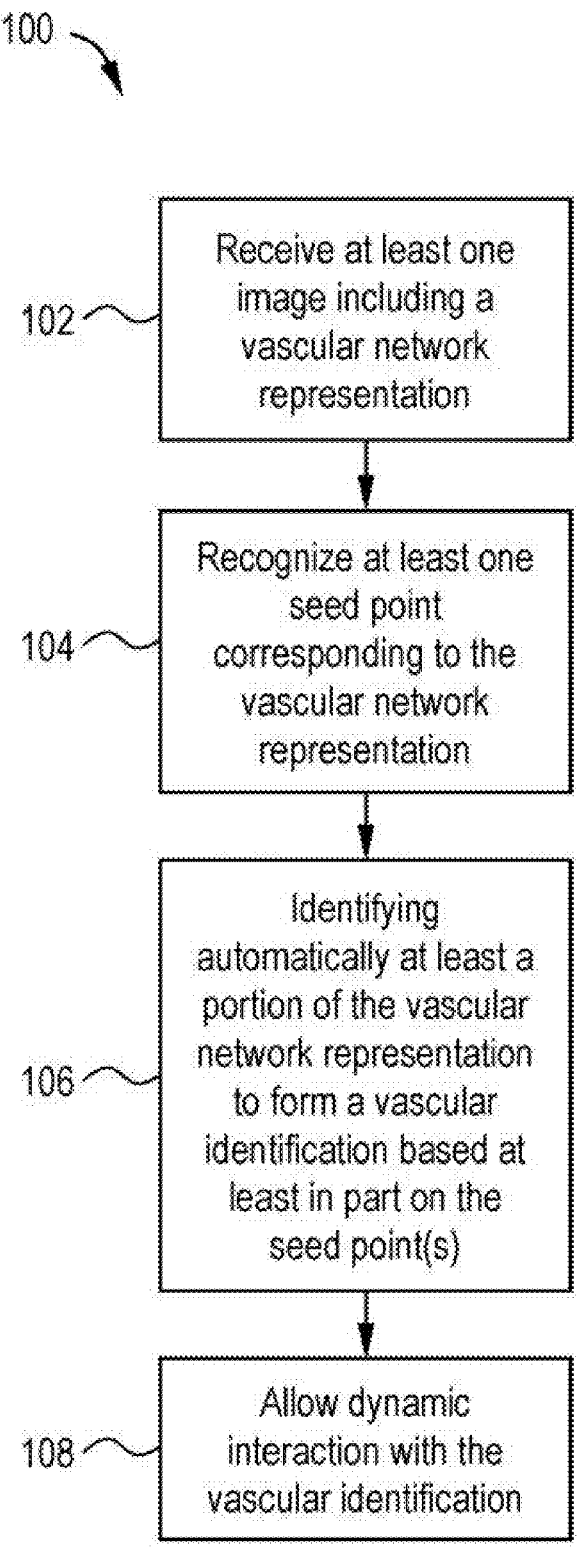
FIG. 1 shows a flowchart of a method for dynamically interacting with a vascular identification in accordance with an embodiment of the present invention.

The foregoing summary, as well as the following detailed description of certain embodiments of the present application, will be better understood when read in conjunction with the appended drawings. For the purpose of illustrating the invention, certain embodiments are shown in the drawings. It should be understood, however, that the present invention is not limited to the arrangements and instrumentality shown in the attached drawings. Some figures may be representative of the types of images and displays which may be generated by disclosed methods and systems.

DETAILED DESCRIPTION OF THE INVENTION

Figure 7:
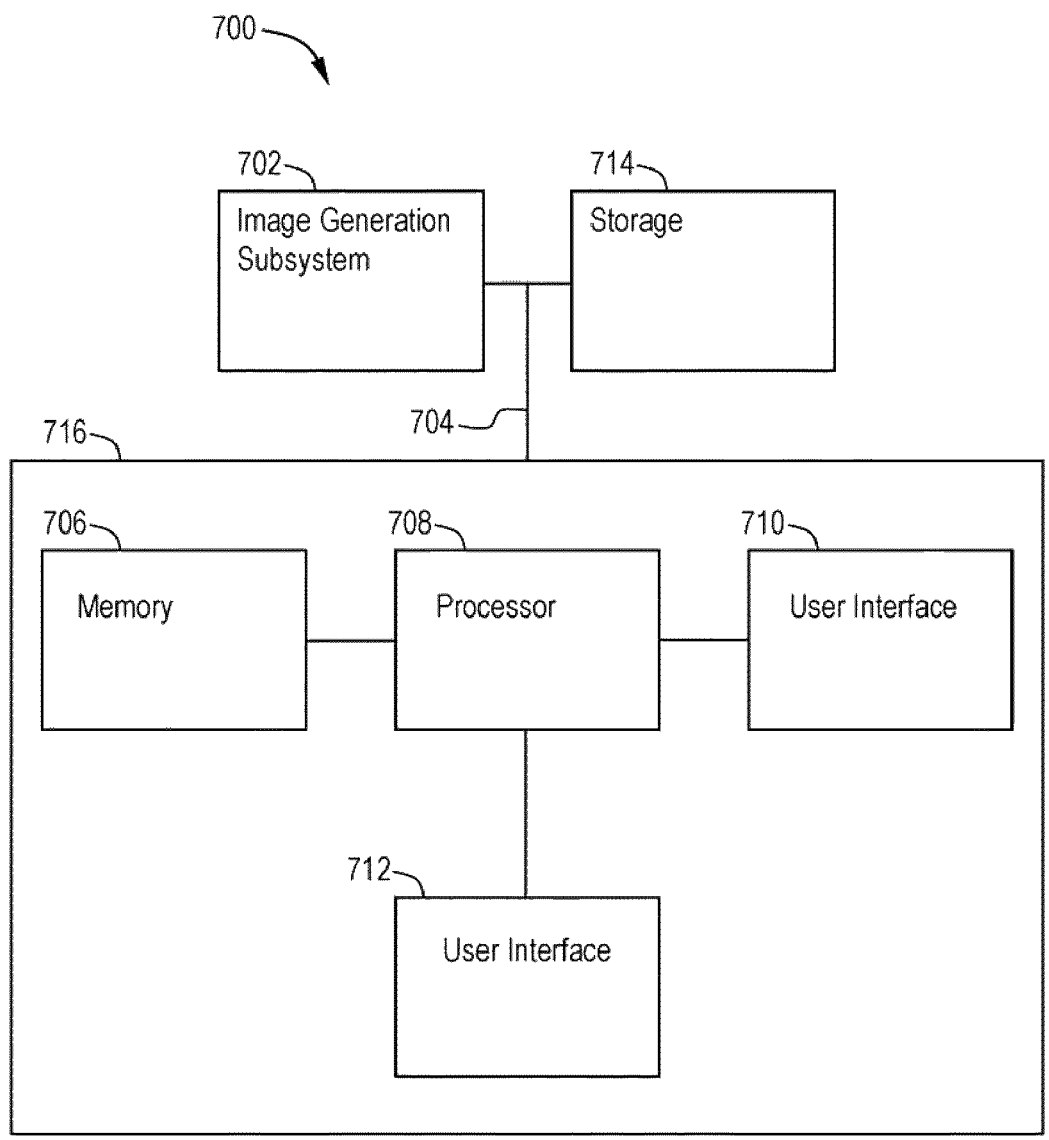
FIG. 7 shows a system for iterative vascular identification, in accordance with an embodiment of the present invention.

FIG. 7 shows a system for iterative vascular identification, in accordance with an embodiment of the present invention. A system 700 may include an image generation subsystem 702 communicatively linked to an image processing subsystem 716 and/or a storage 714 through one or more communications links 704.

An image generation subsystem 702 may be any radiological system capable of generating two-dimensional, three-dimensional, and/or four-dimensional data corresponding to a volume of interest of a patient. Some types of image processing subsystems 702 include computed tomography (CT), magnetic resonance imaging (MRI), x-ray, positron emission tomography (PET), tomosynthesis, and/or the like, for example. An image generation subsystem 702 may generate one or more data sets corresponding to an image which may be communicated over a communications link 704 to a storage 714 and/or an image processing subsystem 716.

A storage 714 may be capable of storing set(s) of data generated by the image generation subsystem 702. The storage 714 may be, for example, a digital storage, such as a PACS storage, an optical medium storage, a magnetic medium storage, a solid-state storage, a long-term storage, a short-term storage, and/or the like. A storage 714 may be integrated with image generation subsystem 702 or image processing subsystem 716, for example. A storage 714 may be locally or remotely located, for example. A storage 714 may be persistent or transient, for example.

An image processing subsystem 716 may further include a memory 706, a processor 708, a user interface, 710 and/or a display 712. The various components of an image processing subsystem 716 may be communicatively linked. Some of the components may be integrated, such as, for example processor 708 and memory 706. An image processing subsystem 716 may receive data corresponding to a volume of interest of a patient. Data may be stored in memory 706, for example.

A memory 706 may be a computer-readable memory, for example, such as a hard disk, floppy disk, CD, CD-ROM, DVD, compact storage, flash memory, random access memory, read-only memory, electrically erasable and programmable read-only memory and/or other memory. A memory 706 may include more than one memories for example. A memory 706 may be able to store data temporarily or permanently, for example. A memory 706 may be capable or storing a set of instructions readable by processor 708, for example. A memory 706 may also be capable of storing data generated by image generation subsystem 702, for example. A memory 706 may also be capable of storing data generated by processor 708, for example.

A processor 708 may be a central processing unit, a microprocessor, a microcontroller, and/or the like. A processor 708 may include more than one processors, for example. A processor 708 may be an integrated component, or may be distributed across various locations, for example. A processor 708 may be capable of executing an application, for example.

A processor 708 may be capable of executing any of the methods in accordance with the present invention, for example. A processor 708 may be capable of receiving input information from a user interface 710, and generating output displayable by a display 712, for example.

A user interface 710 may include any device(s) capable of communicating information from a user to an image processing subsystem 716, for example. A user interface 710 may include a mouse, keyboard, and/or any other device capable of receiving a user directive. For example a user interface 710 may include voice recognition, motion tracking, and/or eye tracking features, for example. A user interface 710 may be integrated into other components, such as display 712, for example. As an example, a user interface 710 may include a touch responsive display 712, for example.

A display 712 may be any device capable of communicating visual information to a user. For example, a display 712 may include a cathode ray tube, a liquid crystal diode display, a light emitting diode display, a projector and/or the like. A display 712 may be capable of displaying radiological images and data generated by image processing subsystem 716, for example. A display may be two-dimensional, but may be capable of indicating three-dimensional information through shading, coloring, and/or the like.

FIG. 1 shows a flowchart of a method 100 for dynamically interacting with a vascular identification in accordance with an embodiment of the present invention. The steps of method 100 may be performed in one or more alternate orders from the exemplary order shown. Furthermore, some steps of method 100 may be omitted. The steps of method may be performed by a computer and/or other processor executing a set of instructions on a computer-readable medium.

At step 102, an image including a vascular network representation may be received. An image may be a radiological image, for example. Some types of radiological images may be generated by computed tomography (CT), magnetic resonance imaging (MRI), x-ray, positron emission tomography (PET), tomosynthesis, and/or the like, for example. An image may be a two-dimensional, three-dimensional, or four-dimensional image (e.g., three-dimensional image over time), for example. An image may correspond to a volume of interest in a patient, for example. An image may contain a plurality of pixels and/or voxels which contain various information, such as grayscale image values. The pixels/voxels in an image may contain information regarding a variety of tissues in a patient's volume of interest.

An image may include a representation of a vascular network in a patient. A vascular network (or a representation thereof) may include blood vessels, such as arteries, arterioles, capillaries, venules, veins and/or the like, for example. A vascular network may include a branch or a tree, for example. A vascular network may include a portion of a vascular network, for example. A vascular network may include healthy and/or diseased tissue, for example. A vascular network may include pathological structure, for example. A vascular network may include biological tissue and/or synthetic materials, such as stents, shunts, catheters, and/or the like, for example. A vascular network may include the lumen, false lumen, calcifications, aneurysms of blood vessels, for example. A vascular network may contain vascular tissues and/or fluids or other objects contained within blood vessels, for example. The vascular network may be represented in the image in two-dimensional, three-dimensional, and/or four-dimensional, for example. The vascular network may be identifiable based on pixel/voxel information, such as grayscale information, for example.

An image containing a vascular network representation may be received in a computer-readable memory, for example, such as a buffer, random access memory, optically readable memory, magnetically readable memory, flash memory, programmable read only memory, erasable programmable read only memory, electronically erasable programmable read only memory, and/or the like. For example, the image may be received in random access memory, and may be accessible to an application such as software, firmware, and/or the like. An image may be a composition of other images. For example, in some radiological modalities such as CT, it may be possible to combine a plurality of two-dimensional slices to create a three-dimensional image.

Figure 8:
FIG. 8 shows an example of a representation of a vascular network in a patient, in accordance with an embodiment of the present invention.

Turning for a moment FIG. 8, an example of a representation of a vascular network in a patient is shown, in accordance with an embodiment of the present invention. Radiological image data is shown of a patient's anatomy. A vascular network is included in the image data. A particular area of interest including a vascular network is shown as 804, within a box 802. The image in FIG. 8 may be generated by CT, and contains information corresponding to three dimensions. A user may be able to select various dimensional views corresponding to the image, such as the one shown in FIG. 8. It may be possible to view multiple dimensions at the same time, for example. As seen, the image may contain various grayscale information corresponding to pixels/voxels that is representative of different tissues and fluids in a patient's anatomy. In FIG. 8, a vascular network appears somewhat lighter than other nearby tissue in the patient's anatomy.

Turning back to FIG. 1, at step 104, at least one seed point corresponding to the vascular network is identified. A seed point may be selected by a user, or may be automatically generated, for example. A seed point may correspond to a particular region of a vascular network, for example. A seed point may be a one-dimensional, two-dimensional, three-dimensional, and/or four-dimensional value, for example. A seed point may be integrated into the image discussed in conjunction with step 102, or may be part of a separate set of data, for example. A seed point may have a identifiable data structure, for example. More than one seed point may be identifiable, for example. A start seed point and end seed point may be identifiable. A start seed point may, for example, correspond to a proximal region of a vascular network. An end seed point may, for example, correspond to a distal region of a vascular network.

A seed point may be identified by a computer or processor executing a set of instructions storable on a computer-readable memory, for example, such as a buffer, random access memory, optically readable memory, magnetically readable memory, flash memory, programmable read only memory, erasable programmable read only memory, electronically erasable programmable read only memory, and/or the like. Further a seed point, may be received into computer-readable memory, such as a buffer, cache, database or other memory structure. A seed point may be identified by an application such as software, firmware, and/or the like.

Figure 9:
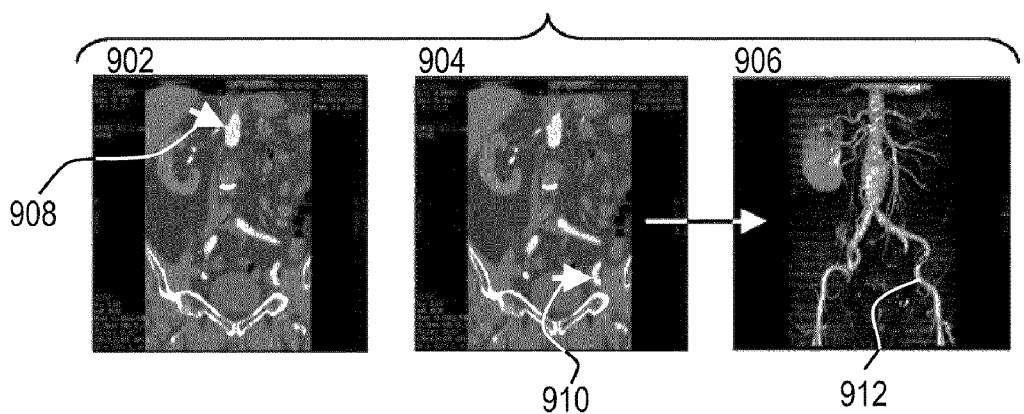
FIG. 9 shows an example of automatically generating a vascular identification, in accordance with an embodiment of the present invention.

Turning for a moment FIG. 9, an example of how seed points may be selected in conjunction with a representation of a vascular network is shown in accordance with an embodiment of the present invention. A seed point 908 may be selected, either by a user or automatically, that corresponds to a proximal region of a vascular network of interest, for example. In the first pane 902 a proximal seed point 908 is shown (with a white arrow) being selected on an axial dimension of a radiological image. The proximal seed point is located in a portion of a vascular network representation (shown with a lighter shade). In the second pane 904 a distal seed point 910 is shown (with a white arrow) being selected on an axial dimension of a radiological image. The distal seed point is located in a portion of a vascular network representation (shown with a lighter shade). A second seed point, such as a distal seed point 910, may be useful in limiting the scope of any subsequent vascular analysis, for example. For example, the second seed point may be a marker to indicate where vascular analysis should stop. For example, if a clinician wishes to only analyze a specific region, such as a lesion, a second seed point may be selected to limit the scope of vascular analysis. It may be possible to select only one seed point (e.g. a proximal seed point), or it may be possible to select seed points in other dimensions (e.g., sagittal, coronal, and/or oblique dimensions). Once selected, the seed point may be identified, for example, as discussed in step 104.

Turning back to FIG. 1, at step 106, at least a portion of the vascular network in the image received at step 102 may be identified automatically based on identified seed point(s) identified at step 104. Certain details corresponding to algorithms for automatic vascular network recognition may be disclosed in AT No. 12553-440, for example. For example, a single branch of a vascular network may be identified. As another example, a multiple-branched portion of a vascular network may be identified. A series of vascular networks may be identified, for example. An identified vascular network may be two-dimensional, three-dimensional, and or four-dimensional, for example. A vascular network may be identified because it is in the region of a seed point(s). The start and stop points (e.g., proximal and distal ends) of an identified vascular network may correspond to seed point(s). The methods and systems behind automatic identification algorithms may be independent of the imaging modality chosen to generate a radiological image containing a vascular network. For example, limitations in an imaging system may correspond to limitations in an acquired image. It is understood that improvements in image acquisition may lead to improvements in vascular network identification without altering algorithms for automatic vascular network recognition. For example, some images may not have enough small enough pixels/voxels to resolve smaller blood vessels, such as capillaries. Other images may contain pixels/voxels to resolve smaller blood vessels, such as capillaries, for example.

Automatic vascular identification may result from quick and/or extended analysis, for example. Extended analysis may be useful for identifying more distal parts of vessels and broader networks, for example. Vascular identification may be suitable on a medical image analysis application capable of displaying dimensional views (e.g., axial sagittal, coronal), reformatted oblique views, and/or three-dimensional views, for example.

Automatic identification may result in shape(s) that correspond to the vascular identification. The shape(s) may be storable as separate data set(s) from the underlying image(s) and/or seed point(s). The shape(s) may also be storable in an integrated manner with the underlying image(s) and/or seed point(s). The shape(s) may have markers and/or mapping indications that link the shape(s) to the underlying image(s) and/or seed point(s) for example. The vascular identification may be storable/retrievable from any computer-readable storage medium, such as computer-readable memory, for example, such as a buffer, random access memory, optically readable memory, magnetically readable memory, flash memory, programmable read only memory, erasable programmable read only memory, electronically erasable programmable read only memory, and/or the like, for example.

A vascular identification may be displayable to a user or otherwise transformed into a graphic representation, such as through printing, for example. The vascular identification may be displayable in context with underlying image(s) and/or seed point(s), for example. A vascular identification may be displayable in a two-dimensional form, but may include information corresponding to three-dimensional and/or four-dimensional, for example (e.g. shading, coloring, etc.).

A vascular identification may include centerline information, cross-section information, tissue information, non-tissue information, kinetic information, branch information, marker information, annotations and/or the like. For example, a vascular identification may include centerline information corresponding to the identified center of identified blood vessels. Centerline information may resemble a skeletal view of a vascular network and may not include cross-section information, for example. Cross-section information may include data about the identified cross-sections of the blood vessels at various parts of the identified network. Cross-section information may vary from one vessel to the next, or along a single vessel, for example. An artery may have a larger cross-section than a capillary, for example. Tissue information may include data corresponding to various tissue types and/or fluid types found in a vascular network, for example. Tissue information may include data corresponding to blood, plasma, legions, lumens, false lumens, calcifications and/or the like. Non-tissue information may include data corresponding to foreign objects, such as stents, shunts, catheters, and/or other foreign objects in or near to an identified vascular network. Kinetic information may include data corresponding to motion of a vascular network, such as movements of the network corresponding to various stages of circulation (e.g. systole, diastole), tissue expansion/contraction (e.g. musculature), and/or breathing, for example. Branch information may include data corresponding to a particular branch and/or sub-branch, for example. Marker information may include markers useful for clinicians and/or data processing applications, for example. Annotations may include alphanumeric information corresponding to one or more portions of a vascular identification.

Information and/or data in a vascular identification may be storable in an integrated fashion, or may be separable, for example. Further, information in a vascular identification may be selectable, sortable, and/or the like. For example, a user or data processing software may be able to select or sort various types of data. As an example, a user may be able to select particular type(s) of information, and receive feedback corresponding to the selected type(s) of information. A user may, for example, select a branch or an annotation, and a data processing application may highlight the selected branch or annotation.

Turning for a moment back to FIG. 9, an example of step 106 is shown. FIG. 9 shows an example of automatically generating a vascular identification, in accordance with an embodiment of the present invention. As previously discussed, seed points 908 and 910 were selected in the first two panes 902, 904. After seed point selection, a vascular identification 912 was automatically generated, and is shown in the third pane 906. The vascular identification 912 includes centerline and cross-section information corresponding to a portion of the vascular network. Note in this example, that only one branch has been automatically identified. Furthermore, because a second distal seed point was selected by a user, the automatic identification has stopped at a point along the identified branch corresponding to the distal seed point. In other words, the identification stops at the second seed point. The proximal seed point may be the start point for the identification, or the algorithm may use the proximal seed point to identify other nearby structure as a preferable starting point for automatic vascular identification. The vascular identification in the third pane 906 is shown as a three-dimensional-type image. However, a vascular identification may also be displayed in two-dimensional (or four-dimensional), in any of a variety of dimensions, such as axial, sagittal, coronal, and/or oblique.

Figure 10:
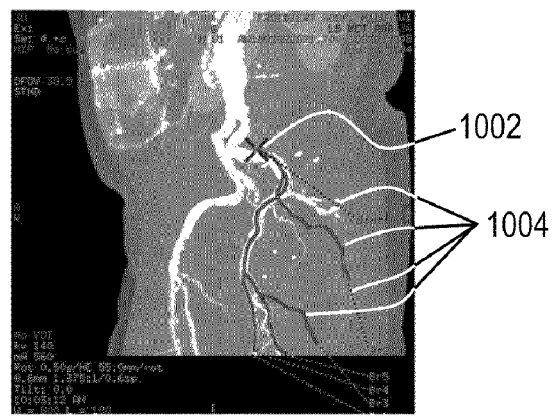
FIG. 10 shows an example of automatically generating a vascular identification, in accordance with an embodiment of the present invention.

Turning now to FIG. 10, another example of step 106 is shown. FIG. 10 shows an example of automatically generating a vascular identification, in accordance with an embodiment of the present invention. A single proximal seed point 1002 may be selected. After selection of seed point 1002, an automatic vascular identification may start, resulting in a vascular identification 1004 including distal portions of a vascular network. A user may be able to see the vascular identification 1004 growing in real-time as calculated by the algorithm, for example. The user may be able to stop the growth of the identification 1004 once satisfied with the inclusion of various portions of interest, for example.

Turning back to FIG. 1, at step 108, dynamic interaction with the vascular identification may be allowed to form an iterative vascular identification. For example, a user may be allowed to dynamically interact with one or more vascular identifications. A user may interact with vascular identifications through an application running on a computer or processor executing computer-readable media, such as computer-readable memory, read-only memory, buffer, random access memory, optically readable memory, magnetically readable memory, flash memory, programmable read only memory, erasable programmable read only memory, electronically erasable programmable read only memory, and/or the like, for example. A user may employ a user interface, such as a mouse and/or keyboard to interact with one or more vascular identifications, for example. A user may view a vascular identification through a display, such as a cathode ray tube, a liquid crystal diode display, a light emitting diode display, and/or the like. The user may then interact through a user interface with a displayed vascular identification and underlying image, for example. The user may view multiple views of an image and/or vascular identification at the same time, for example. The user may see, for example axial, sagittal, coronal, and/or three-dimensional views of the image and/or vascular identification in various panels, for example.

The results of an interaction may form an iterative vascular identification. The results, such as an iterative vascular identification, may be displayed substantially in real-time to a user, for example. Processing may be expedited for substantially real-time feedback by not recalculating an entire vascular identification for each interactive iteration, for example. As an illustrative example, a user may interact with a vascular identification and, as a result, the application may process the iterative changes to the vascular identification to form an iterative vascular identification, without having to recalculate the portions of the identification that remain unchanged.

Various types of interactions may be allowed including: extending a portion of a vascular identification; adding a portion of a vascular identification; removing a portion of a vascular identification; altering a portion of a vascular identification; renaming a portion of a vascular identification; bridging two or more portions of a vascular identification (or a portion of two or more vascular identifications); and altering a view of a vascular identification, for example. Types of interactions are discussed in further detail in conjunction with methods 200, 300, 400, 500, and 600, for example.

Figure 2:
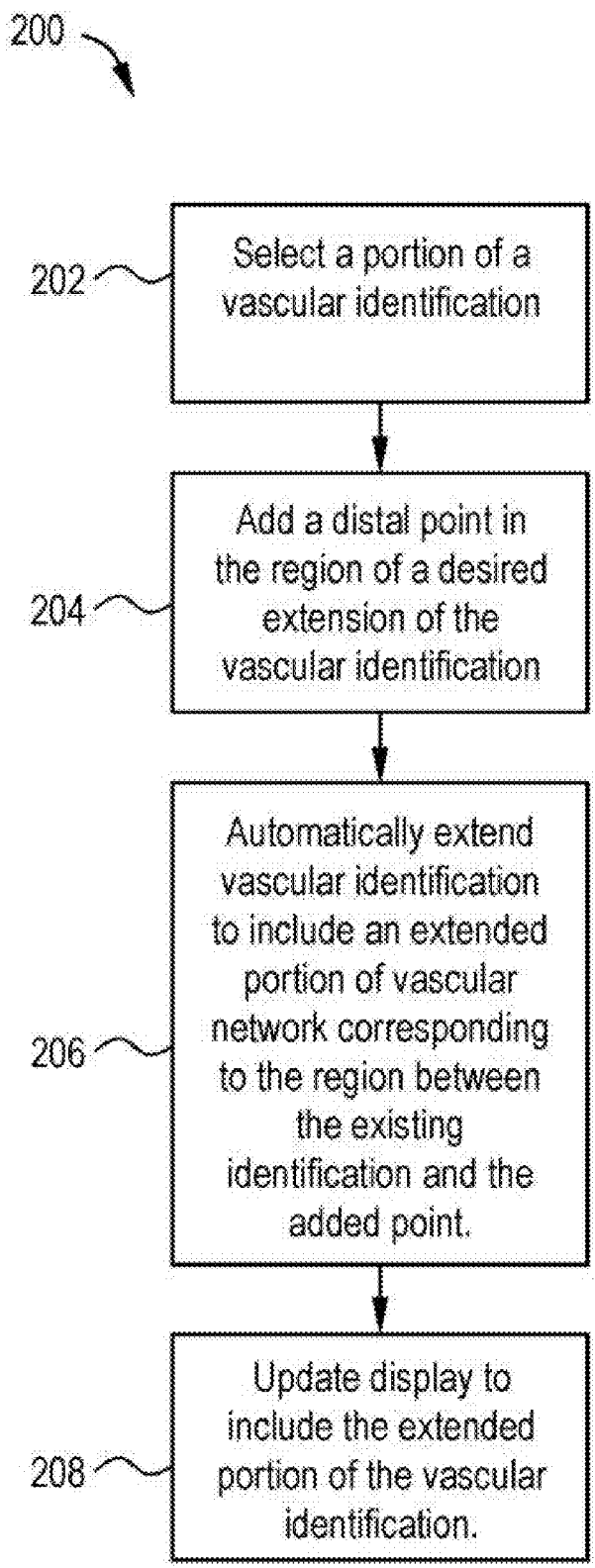
FIG. 2 shows a flowchart of a method for extending a portion of a vascular identification in accordance with an embodiment of the present invention.

FIG. 2 shows a flowchart of a method 200 for extending a portion of a vascular identification in accordance with an embodiment of the present invention. The steps of method 200 may be performed in an alternate order as shown, for example. Furthermore, some steps of method 200 may be omitted, for example. The steps of method may be performed by a computer and/or other processor executing a set of instructions on a computer-readable medium, for example.

At step 202 a portion of a vascular identification may be selected. For example, a user may select a portion of a vascular identification. As another example, a portion of a vascular identification may be selected automatically, as by a computer or a processor, for example. A vascular identification may be selected by a user through a user interface, for example. A user may view a vascular identification and underlying image on a display, for example. A user may employ a user interface to select a portion of a vascular identification, or a marker or annotation corresponding to a portion of a vascular identification. For example, a user may use a mousing device to click on or otherwise select on a relevant portion of a vascular identification, or a marker or annotation corresponding to a portion of a vascular identification. A user may also be able to select multiple portions, for example. An application may recognize the user's actions, and may provide visual feedback to the user indicating that a selection has been made. For example, feedback may include changing a color, contrast, and/or shading of a selected portion of a vascular identification and/or corresponding marker or annotation.

At step 204, a distal point in a region of a desired extension of the vascular identification may be added. A distal point may be added through a user interface, similar to that discussed in step 202. A distal point may be added by a user, for example, or may be added automatically. For example, a distal point may be added by a user employing a mousing device and clicking on or otherwise selecting the location of the desired point to be added. A distal point may be called a seed point, and or the like. A distal point may correspond to a location of a vascular network in the underlying image. A distal point may be selected in one, two, three or four dimensions, for example. For example, multiple axes may be displayed simultaneously showing various dimensions, and a user may locate a single point along the various dimensions. An application may provide feedback to a user that a distal point has been added by showing the distal point as a graphical representation. The representation may be displayed in context with the image and/or the vascular identification, for example.

At step 206, a vascular identification may be automatically extended to include an extended portion of vascular network corresponding to the region between the existing identification and the added point. The results of automatic extension may form an iterative vascular identification. Certain details corresponding to algorithms for automatic extension of vascular identifications may be disclosed in AT No. 12553-440. An extension of a vascular identification may be information capable of being displayed in two-dimensional, three-dimensional, and or four-dimensional, for example. An extension of a vascular identification may be in the region of distal point(s) added in step 204, for example. As previously discussed, the methods and systems behind automatic extension of vascular identifications may be independent of the imaging modality chosen to generate a radiological image containing a vascular network.

Automatic extension of a vascular identification may result from either quick or extended analysis, for example. Extended analysis may be useful for identifying more distal parts of vessels and broader networks, for example. Automatic extension of a vascular identification may be suitable on a medical image analysis application capable of displaying dimensional views (e.g., axial sagittal, coronal), reformatted oblique views, and/or three-dimensional views, for example.

Automatic extension of a vascular identification may result in shape(s) that correspond to the extension of the vascular identification. The shape(s) may be storable as separate data set(s) from the underlying image, the original identification and/or seed point(s). The shape(s) may also be storable in an integrated manner with the underlying image(s), the original vascular identification, and/or seed point(s). The shape(s) may have markers and/or mapping indications that link the shape(s) to the underlying image(s), original identification, and/or seed point(s) for example. The extension of a vascular identification may be storable/retrievable from any computer-readable storage medium, such as computer-readable memory, for example, such as a buffer, random access memory, optically readable memory, magnetically readable memory, flash memory, programmable read only memory, erasable programmable read only memory, electronically erasable programmable read only memory, and/or the like, for example.

Similar to the original identification, an extension of a vascular identification may include centerline information, cross-section information, tissue information, non-tissue information, kinetic information, branch information, marker information, annotations and/or the like. Information and/or data in a vascular identification may be storable in an integrated fashion, or may be separable, for example. Further, information in a vascular identification may be selectable, sortable, and/or the like. For example, a user or data processing software may be able to select or sort various types of data. As an example, a user may be able to select particular type(s) of information, and receive feedback corresponding to the selected type(s) of information. A user may, for example, select a branch or an annotation, and a data processing application may highlight the selected branch or annotation.

An automatic extension of a vascular identification may be generated and passed on to step 208 for display in real-time, for example. An application performing automatic extension may not have to re-identify previously identified portions of the vascular identification, for example. Alternatively, an application performing automatic extension may re-identify a subset of the original identification during extension identification. For example, a subset for identification may include portions of the new identification that are not substantially similar to the original identification.

At step 208, a display may be updated to include the extended portion of the vascular identification. For example, the display may show the extended portion of the vascular identification integrated with the original portion of the vascular identification. The display may show the extended portion in a separate color or in an original color, for example. The display may be updated to show the extended portion in context with the underlying image, for example. The display may be updated to show more than one simultaneous view, such as axial, sagittal, coronal, and/or three-dimensional views, for example. The display may be updated substantially in real-time, for example, as measured from the time between the previous user interaction and the updating of the display. The display may indicate other feedback in response to actions performed in method 200, such as a text message indicative that an automatic extension of a vascular identification has been performed, for example. A vascular identification may be displayable in a two-dimensional form, but may include information corresponding to three-dimensional and/or four-dimensional, for example (e.g. shading, coloring, etc.).

Figure 11:
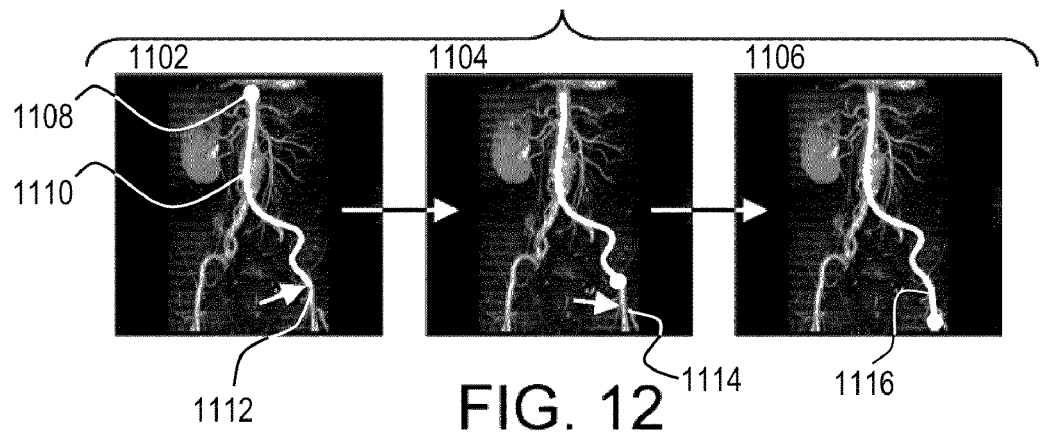
FIG. 11 shows an example of extending a portion of a vascular identification, in accordance with an embodiment of the present invention.

FIG. 11 shows an example of extending a portion of a vascular identification, in accordance with an embodiment of the present invention. In the first pane 1102, a proximal seed point 1108 and a distal seed point 1112 form the boundary of a vascular identification 1110 including a branch of a vascular network. The clinician may decide that the identification should be extended. Thus, in the second pane 1104, the clinician may add a new distal seed point 1114 (or move the old distal point 1112 to a new location 1114) by interacting with the vascular identification 1110. For example, the vascular identification may be displayed to the user along with underlying radiological image data. The user may then select a new distal seed point 1114 corresponding to a more distal location for vascular identification. After placement of the distal seed point 1114, an iterative vascular identification 1116 may be automatically generated corresponding to an extension of the original vascular identification 1112, as shown in the third pane 1106. For example, such automatic iterative vascular identification may be performable as discussed in methods 100 and 200.

Figure 3:
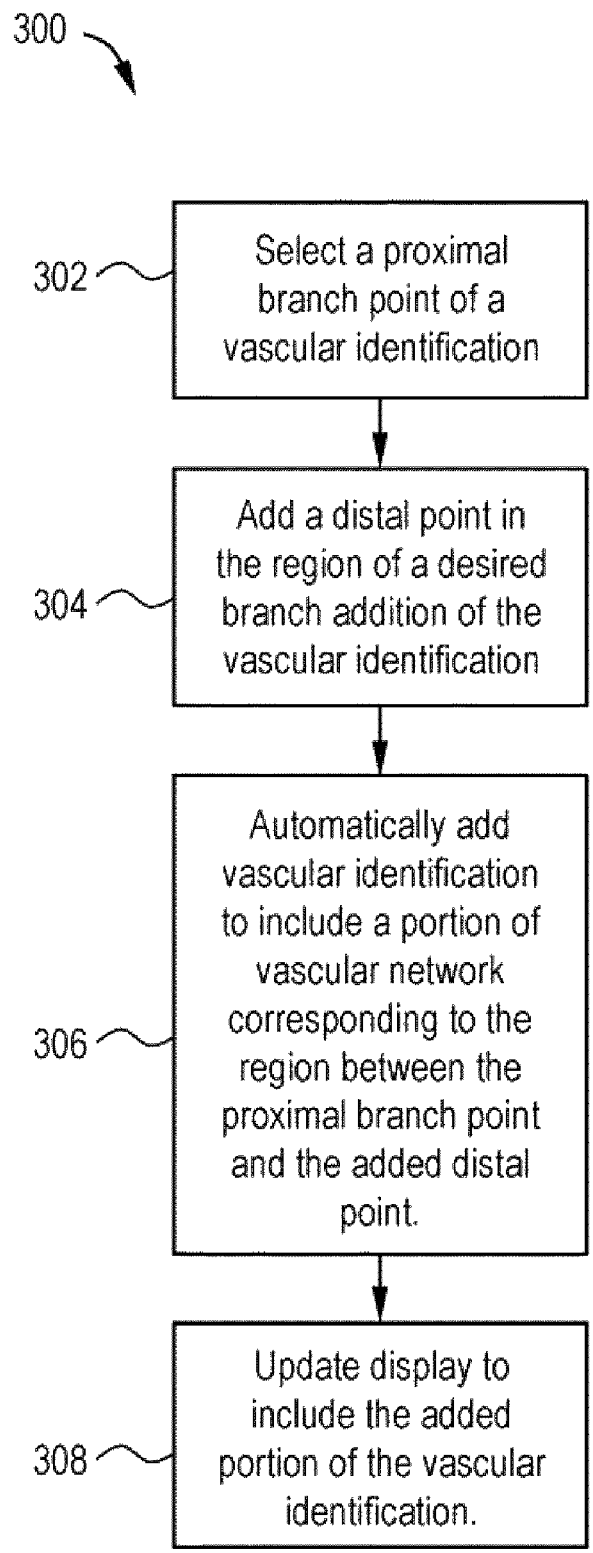
FIG. 3 shows a flowchart of a method for adding a portion of a vascular identification in accordance with an embodiment of the present invention.

FIG. 3 shows a flowchart of a method 300 for adding a portion of a vascular identification in accordance with an embodiment of the present invention. The steps of method 300 may be performed in an alternate order as shown, for example. Furthermore, some steps of method 300 may be omitted, for example. The steps of method may be performed by a computer and/or other processor executing a set of instructions on a computer-readable medium, for example. Method 300 may be useful for adding a branch of a vascular network to the original identification, for example. The method may employ an original proximal seed point or a bifurcation point, for example. A bifurcation point may be a region where vascular network branches bifurcate, for example At step 302 a portion of a vascular identification may be selected. For example, a user may select a proximal branch point of a vascular identification. As another example, a proximal branch point of a vascular identification may be selected automatically, as by a computer or a processor, for example. A proximal branch point of a vascular identification may be selected by a user through a user interface, for example. A user may view a vascular identification and underlying image on a display, for example. A user may employ a user interface to select a proximal branch point of a vascular identification, or a marker or annotation corresponding to a proximal branch point of a vascular identification. For example, a user may use a mouse with a left or right button to left or right click on a relevant proximal branch point of a vascular identification, or a marker or annotation corresponding to a proximal branch point of a vascular identification. A user may also be able to select multiple portions, for example. An application may recognize the user's actions, and may provide visual feedback to the user indicating that a selection has been made. For example, feedback may include changing a color, contrast, and/or shading of a selected proximal branch point of a vascular identification and/or corresponding marker or annotation.

At step 304 a distal point in the region of a desired addition of the vascular identification may be added. A distal point may be added through a user interface, similar to that discussed in step 302. A distal point may be added by a user, for example, or may be added automatically. For example, a distal point may be added by a user employing a mousing device and clicking or otherwise selecting on the location of the desired point to be added. A distal point may be called a seed point, and or the like. A distal point may correspond to a location of a vascular network in the underlying image. A distal point may be selected in one, two, three or four dimensions, for example. For example, multiple axes may be displayed simultaneously showing various dimensions, and a user may locate a single point along the various dimensions. An application may provide feedback to a user that a distal point has been added by showing the distal point as a graphical representation. The representation may be displayed in context with the image and/or the vascular identification, for example.

At step 306, a vascular identification may be automatically added to include a portion of vascular network corresponding to the region between the proximal branch point and the added distal point. The results of automatic addition may form an iterative vascular identification. Certain details corresponding to algorithms for automatic addition of vascular identifications may be disclosed in AT No. 12553-440. An extension of a vascular identification may be information capable of being displayed in two-dimensional, three-dimensional, and or four-dimensional, for example. An addition of a vascular identification may be in the region of distal point(s) added in step 304, for example. As previously discussed, the methods and systems behind automatic addition of vascular identifications may be independent of the imaging modality chosen to generate a radiological image containing a vascular network.

Automatic addition of a vascular identification may result from either quick or extended analysis. Extended analysis may be useful for identifying more distal parts of vessels and broader networks, for example. Automatic addition of a vascular identification may be suitable on a medical image analysis application capable of displaying dimensional views (e.g., axial sagittal, coronal), reformatted oblique views, and/or three-dimensional views, for example.

Automatic addition of a vascular identification may result in shape(s) that correspond to the addition of the vascular identification. The shape(s) may be storable as separate data set(s) from the underlying image, the original identification and/or seed point(s). The shape(s) may also be storable in an integrated manner with the underlying image(s), the original vascular identification, and/or seed point(s). The shape(s) may have markers and/or mapping indications that link the shape(s) to the underlying image(s), original identification, and/or seed point(s) for example. The addition of a vascular identification may be storable/retrievable from any computer-readable storage medium, such as computer-readable memory, for example, such as a buffer, random access memory, optically readable memory, magnetically readable memory, flash memory, programmable read only memory, erasable programmable read only memory, electronically erasable programmable read only memory, and/or the like, for example.

Similar to the original identification, an addition of a vascular identification may include centerline information, cross-section information, tissue information, non-tissue information, kinetic information, branch information, marker information, annotations and/or the like. Information and/or data in an addition to a vascular identification may be storable in an integrated fashion, or may be separable, for example. Further, information in an addition to a vascular identification may be selectable, sortable, and/or the like. For example, a user or data processing software may be able to select or sort various types of data. As an example, a user may be able to select particular type(s) of information, and receive feedback corresponding to the selected type(s) of information. A user may, for example, select a branch or an annotation, and a data processing application may highlight the selected branch or annotation.

An automatic addition of a vascular identification may be generated and passed on to step 308 for display in real-time, for example. An application performing automatic addition may not have to re-identify previously identified portions of the original vascular identification, for example. Alternatively, an application performing automatic addition may re-identify only subset of the original identification during addition identification. For example, a subset for identification may include portions of the new identification that are not substantially similar to the original identification.

At step 308, a display may be updated to include the added portion of the vascular identification. For example, the display may show the added portion of the vascular identification integrated with the original portion of the vascular identification. The display may show the added portion in a separate color or in an original color, for example. The display may be updated to show the added portion in context with the underlying image, for example. The display may be updated to show more than one simultaneous view, such as axial, sagittal, coronal, and/or three-dimensional views, for example. The display may be updated substantially in real-time, for example, as measured from the time between the previous user interaction and the updating of the display. The display may indicate other feedback in response to actions performed in method 300, such as a text message indicative that an automatic addition of a vascular identification has been performed, for example.

Figure 13:
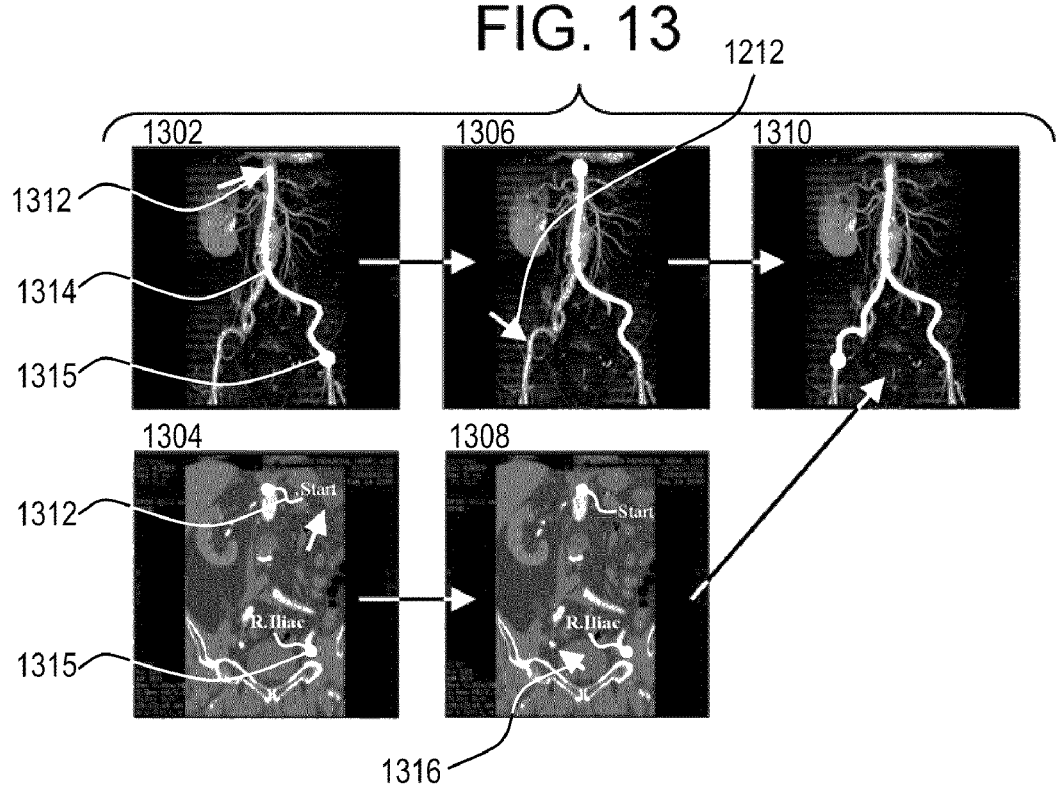
FIG. 13 shows an example of adding a portion of a vascular identification, in accordance with an embodiment of the present invention.
Figure 14:
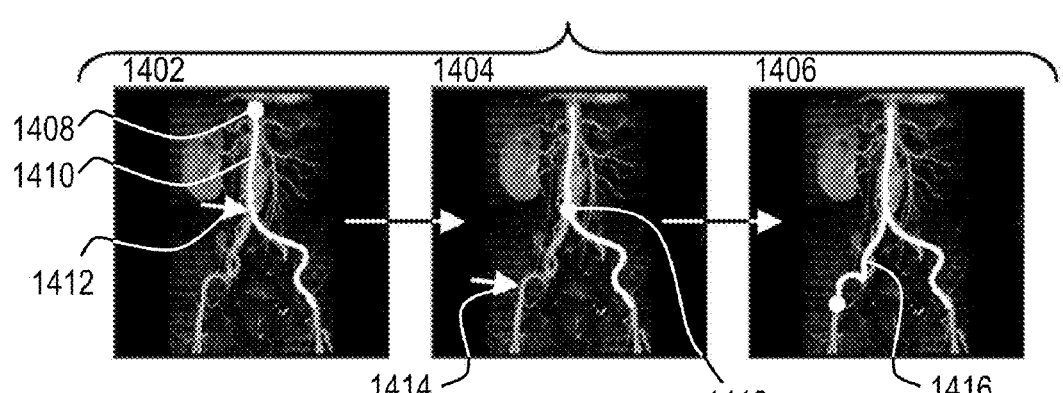
FIG. 14 shows an example of adding a portion of a vascular identification, in accordance with an embodiment of the present invention.

FIGS. 13-14 show examples of adding a portion of a vascular identification, in accordance with embodiments of the present invention. In panes 1302 and 1304, the selection of a proximal seed point 1312 is shown in two different views. In pane 1302 a view is shown including a three dimensional vascular network, whereas in pane 1304, a view is shown including an axial slice of an image of a vascular network. In both views (1302 and 1304) a proximal seed point 1312 is shown. In both views, an original distal seed point 1315 is shown. In pane 1302, an original vascular identification 1314 is shown, resulting from the original seed points 1312 and 1315. In panes 1306 (three-dimensional vascular network) and 1308 (axial slice), a new distal seed point 1316 is indicated, corresponding to an added branch to be included in an iterative vascular identification. After selection of the new seed point 1316, an iterative vascular identification is shown in pane 1310 including the original vascular identification plus an added portion up to the location of the new distal seed point 1316. After placement of the distal seed point 1316, an iterative vascular identification 1318 may be automatically generated corresponding to an addition to the original vascular identification. For example, automatic iterative vascular identification as shown in FIG. 13 may be performable as discussed in methods 100 and 300.

FIG. 14 shows an example of extending a portion of a vascular identification, in accordance with an embodiment of the present invention. In pane 1402, the selection of a proximal seed point 1408 is shown. In pane 1402 a view is shown including a three dimensional vascular network. In pane 1402, an original vascular identification 1410 is shown, resulting from the proximal seed point 1408. Also in pane 1402, a bifurcation point 1412 is shown. In pane 1404, a new seed point 1413 corresponding to a bifurcation point 1412 is indicated. At this new seed point 1413, a new branch should be included in the vascular identification. After selection of the new seed point 1413, an iterative vascular identification 1416 is shown in pane 1406 including the original vascular identification 1410 plus an added portion. After placement of the new seed point 1413, an iterative vascular identification 1416 may be automatically generated corresponding to an addition to the original vascular identification. For example, automatic iterative vascular identification as shown in FIG. 14 may be performable as discussed in methods 100 and 300.

Figure 4:
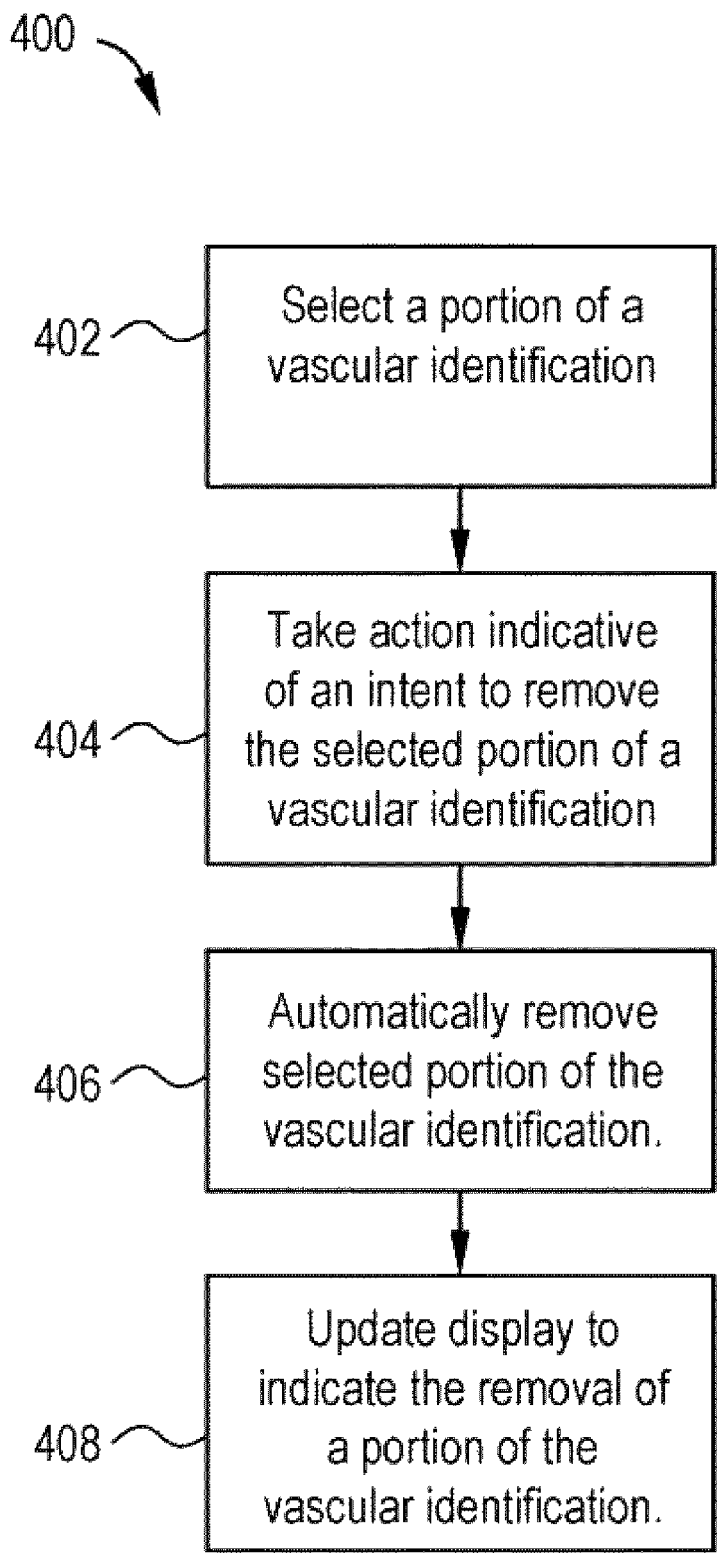
FIG. 4 shows a flowchart of a method for removing a portion of a vascular identification in accordance with an embodiment of the present invention.

FIG. 4 shows a flowchart of a method 400 for removing a portion of a vascular identification in accordance with an embodiment of the present invention. The steps of method 400 may be performed in an alternate order as shown, for example. Furthermore, some steps of method 400 may be omitted, for example. The steps of method may be performed by a computer and/or other processor executing a set of instructions on a computer-readable medium, for example.

At step 402 a portion of a vascular identification may be selected. For example, a user may select a portion of a vascular identification. As another example, a portion of a vascular identification may be selected automatically, as by a computer or a processor, for example. A vascular identification may be selected by a user through a user interface, for example. A user may view a vascular identification and underlying image on a display, for example. A user may employ a user interface to select a portion of a vascular identification, or a marker or annotation corresponding to a portion of a vascular identification. For example, a user may use a mousing device and clicking or otherwise selecting on a relevant portion of a vascular identification, or a marker or annotation corresponding to a portion of a vascular identification. A user may also be able to select multiple portions, for example. An application may recognize the user's actions, and may provide visual feedback to the user indicating that a selection has been made. For example, feedback may include changing a color, contrast, and/or shading of a selected portion of a vascular identification and/or corresponding marker or annotation.

At step 404, action indicative of an intent to remove the selected portion of a vascular identification may be taken. For example, a user may drag and drop the selected portion onto an icon for removal, like a trash can or the like. As another example, a user may right click on a selected portion and make use of a contextual menu. In a contextual menu, a user may select a removal option. Removal may be permanent or semi-permanent. For example, an undo option may be available. Other options include selecting a removal option from a menu or other type of option provider—such as a floating window. A user may be first prompted to proceed with removal, or removal may occur without intermediate prompting.

At step 406, a selected portion of the vascular identification may be automatically removed. The results of automatic removal may form an iterative vascular identification. Automatic removal of a vascular identification may be suitable on a medical image analysis application capable of displaying dimensional views (e.g., axial sagittal, coronal), reformatted oblique views, and/or three-dimensional views, for example. A removal of a vascular identification may result in a new vascular identification without the removal portion. It may be possible to remove more than one portion simultaneously through various multiple selection methods (e.g SHIFT key+ mouse click or CTRL key+mouse click), for example. A removal portion may also be shown in different coloring or shading, for example. For example, a removal portion may be shown similar to an extended or added portion as discussed above. For example, a removal portion may be shown in semi-transparent shades and colors to indicate removal.

At step 408, a display may be updated to include the removed portion of the vascular identification. For example, the display may not show the removed portion of the vascular identification integrated with the original portion of the vascular identification. For example, a removed portion may be shown in a separate color or shading, such as a semi-transparent shade. The display may not show the removed portion at all, for example. The display may be updated to show the removed portion in context with the underlying image, for example. The display may be updated to show more than one simultaneous view, such as axial, sagittal, coronal, and/or three-dimensional views, for example. The display may be updated substantially in real-time, for example, as measured from the time between the previous user interaction and the updating of the display. The display may indicate other feedback in response to actions performed in method 400, such as a text message indicative that an automatic removal of a vascular identification has been performed, for example.

Figure 15:
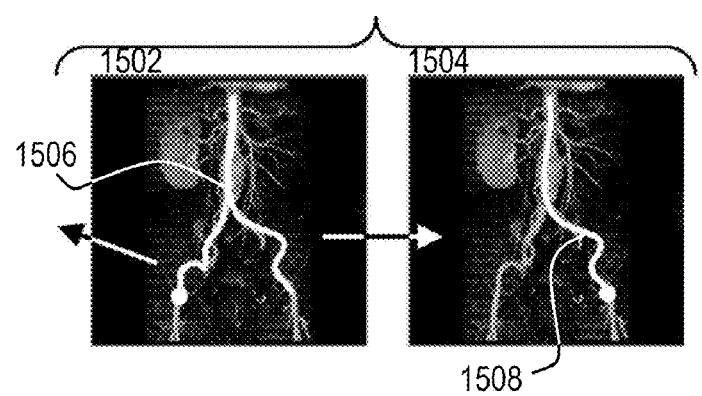
FIG. 15 shows an example of removing a portion of a vascular identification, in accordance with an embodiment of the present invention.

FIG. 15 shows an example of removing a portion of a vascular identification, in accordance with an embodiment of the present invention. At pane 1502, an original vascular identification 1506 is shown including two branches of a vascular network. However, the clinician wishes to remove the left branch. To accomplish this, the clinician may either select a seed point corresponding to the left branch, or otherwise select the left branch (e.g. by clicking on the branch with a mouse). After selecting the left branch or corresponding seed point, a user may take an action indicative of removal, such as pressing the delete key. In response an iterative vascular identification 1508 is automatically generated, as shown in pane 1504. For example, automatic iterative vascular identification as shown in FIG. 15 may be performable as discussed in methods 100 and 400.

Figure 5:
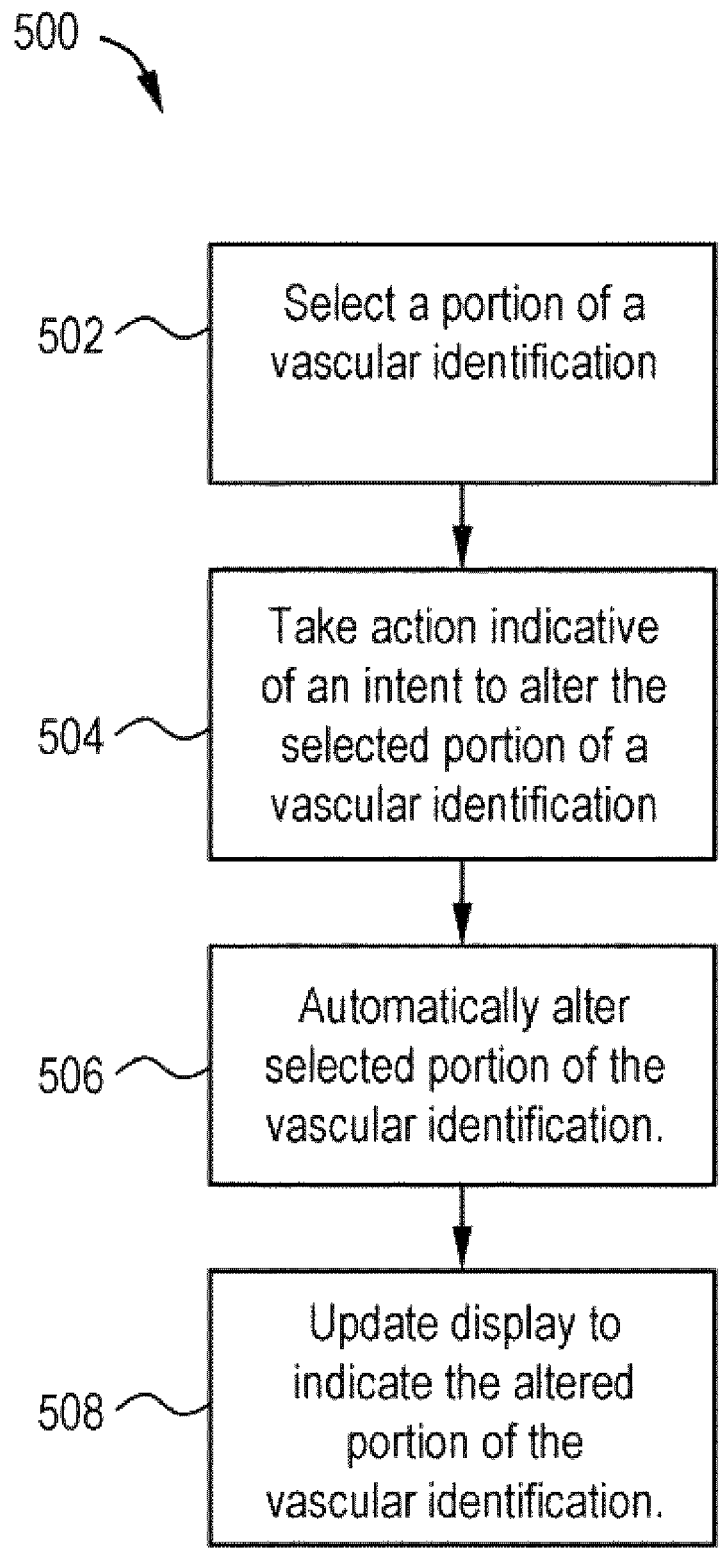
FIG. 5 shows a flowchart of a method for altering a portion of a vascular identification in accordance with an embodiment of the present invention.

FIG. 5 shows a flowchart of a method 500 for altering a portion of a vascular identification in accordance with an embodiment of the present invention. The steps of method 500 may be performed in an alternate order as shown, for example. Furthermore, some steps of method 500 may be omitted, for example. The steps of method may be performed by a computer and/or other processor executing a set of instructions on a computer-readable medium, for example.

At step 502 a portion of a vascular identification may be selected. For example, a user may select a portion of a vascular identification. As another example, a portion of a vascular identification may be selected automatically, as by a computer or a processor, for example. A vascular identification may be selected by a user through a user interface, for example. A user may view a vascular identification and underlying image on a display, for example. A user may employ a user interface to select a portion of a vascular identification, or a marker or annotation corresponding to a portion of a vascular identification. For example, a user may use a mousing device and clicking or otherwise selecting on a relevant portion of a vascular identification, or a marker or annotation corresponding to a portion of a vascular identification. A user may also be able to select multiple portions, for example. An application may recognize the user's actions, and may provide visual feedback to the user indicating that a selection has been made. For example, feedback may include changing a color, contrast, and/or shading of a selected portion of a vascular identification and/or corresponding marker or annotation.

At step 504, the selected portion of a vascular identification may be altered. Action to alter may be taken by a user, or may be performed automatically, such as by an application running on a computer or processor. For example, a user may drag and drop the selected portion to a new location. As another example, a user may right click on a selected portion and make use of a contextual menu. In a contextual menu, a user may select an altering option, such as to move the selected portion. Alteration may be permanent or semi-permanent. For example, an undo option may be available. Other options include selecting an alteration option from a menu or other type of option provider—such as a floating window. A user may be first prompted to proceed with alteration, or alteration may occur without intermediate prompting. Alteration may include the addition of new seed point(s), removal of seed point(s), alteration of a portion of a centerline, alteration of a portion of a cross-section, and/or the like, for example. In an embodiment, an alteration of a portion of a cross-section may be applied to a broader portion of a vascular identification, or such an alteration may be applied to only the selected cross-section region. Actions to alter the selected portion of a vascular identification may be taken in one, two, three, or four dimensions, for example. As an example, a user may interact with multiple dimensional views (e.g. axial, coronal, and/or sagittal) to take action indicative of an intent to alter the selected portion. For example, a user may select, drag, and drop a centerline in one or more dimension views to perform action indicative of alteration.

At step 506, a selected portion of the vascular identification may be automatically altered. The results of automatic alteration may form an iterative vascular identification. Certain details corresponding to algorithms for automatic alterations of vascular identifications may be disclosed in AT No. 12553-440. An alteration of a vascular identification may be information capable of being displayed in two-dimensional, three-dimensional, and or four-dimensional, for example. An alteration of a vascular identification may be in the region of altered centerlines, altered cross-sections, altered seed points, added seed points and/or removed seed points, as discussed in step 504. As previously discussed, the methods and systems behind automatic alteration of vascular identifications may be independent of the imaging modality chosen to generate a radiological image containing a vascular network.

Automatic alteration of a vascular identification may result from either quick or extended analysis. Extended analysis may be useful for identifying more distal parts of vessels and broader networks, for example. Automatic alteration of a vascular identification may be suitable on a medical image analysis application capable of displaying dimensional views (e.g., axial sagittal, coronal), reformatted oblique views, and/or three-dimensional views, for example.

Automatic alteration of a vascular identification may result in shape(s) that correspond to the alteration of the vascular identification. The shape(s) may be storable as separate data set(s) from the underlying image, the original identification and/or seed point(s). The shape(s) may also be storable in an integrated manner with the underlying image(s), the original vascular identification, and/or seed point(s). The shape(s) may have markers and/or mapping indications that link the shape(s) to the underlying image(s), original identification, and/or seed point(s) for example. The alteration of a vascular identification may be storable/retrievable from any computer-readable storage medium, such as computer-readable memory, for example, such as a buffer, random access memory, optically readable memory, magnetically readable memory, flash memory, programmable read only memory, erasable programmable read only memory, electronically erasable programmable read only memory, and/or the like, for example.

Similar to the original identification, an alteration of a vascular identification may include centerline information, cross-section information, tissue information, non-tissue information, kinetic information, branch information, marker information, annotations and/or the like. Information and/or data in an alteration to a vascular identification may be storable in an integrated fashion, or may be separable, for example. Further, information in an alteration to a vascular identification may be selectable, sortable, and/or the like. For example, a user or data processing software may be able to select or sort various types of data. As an example, a user may be able to select particular type(s) of information, and receive feedback corresponding to the selected type(s) of information. A user may, for example, select a branch or an annotation, and a data processing application may highlight the selected branch or annotation.

An automatic alteration of a vascular identification may be generated and passed on to step 508 for display in real-time, for example. An application performing automatic alteration may not have to re-identify previously identified, unaltered portions of the original vascular identification, for example. Alternatively, an application performing automatic alteration may re-identify only subset of the original unaltered identification during alteration identification. For example, a subset for identification may include portions of the new identification that are not substantially similar to the original identification.

At step 508, a display may be updated to include the altered portion of the vascular identification. For example, the display may show the altered portion of the vascular identification integrated with the original portion of the vascular identification. The display may show the altered portion in a separate color or in an original color, for example. The display may be updated to show the altered portion in context with the underlying image, for example. The display may be updated to show more than one simultaneous view, such as axial, sagittal, coronal, and/or three-dimensional views, for example. The display may be updated substantially in real-time, for example, as measured from the time between the previous user interaction and the updating of the display. The display may indicate other feedback in response to actions performed in method 500, such as a text message indicative that an automatic alteration of a vascular identification has been performed, for example.

Figure 12:
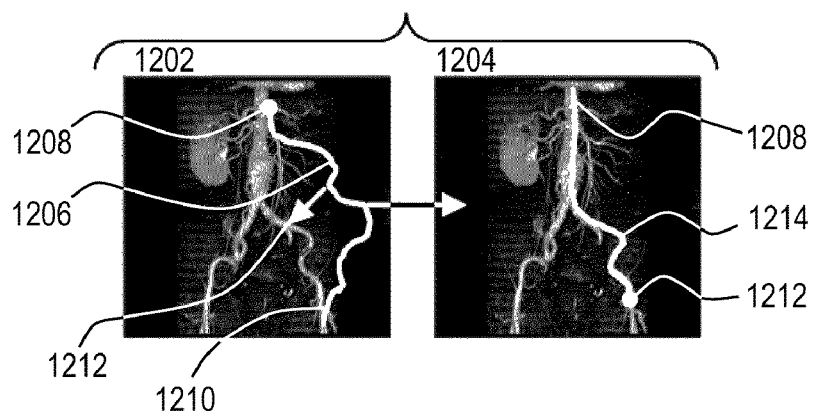
FIG. 12 shows an example of altering a portion of a vascular identification, in accordance with an embodiment of the present invention.

FIG. 12 shows an example of altering a portion of a vascular identification, in accordance with an embodiment of the present invention. At pane 1202, an original vascular identification 1206 is shown between a proximal seed point 1208 and a distal seed point 1210. However, the original vascular identification did not identify the region of interest. Consequently, a clinician interacts with the original identification to adjust it to meet the clinical need. To accomplish this, the clinician may add an intermediate seed point 1212 along the region of interest in the vascular network. Other means of accomplishing this may also be possible, such as dragging and dropping an intermediate portion of the original identification 1206 over to the portion to be included. In response an iterative vascular identification 1214 is automatically generated, as shown in pane 1204. In this case, the iterative identification contains the same proximal seed point 1208 and distal seed point 1210, but has been recalculated to correspond to the region of the vascular network of interest. For example, automatic iterative vascular identification as shown in FIG. 12 may be performable as discussed in methods 100 and 400.

Figure 6:
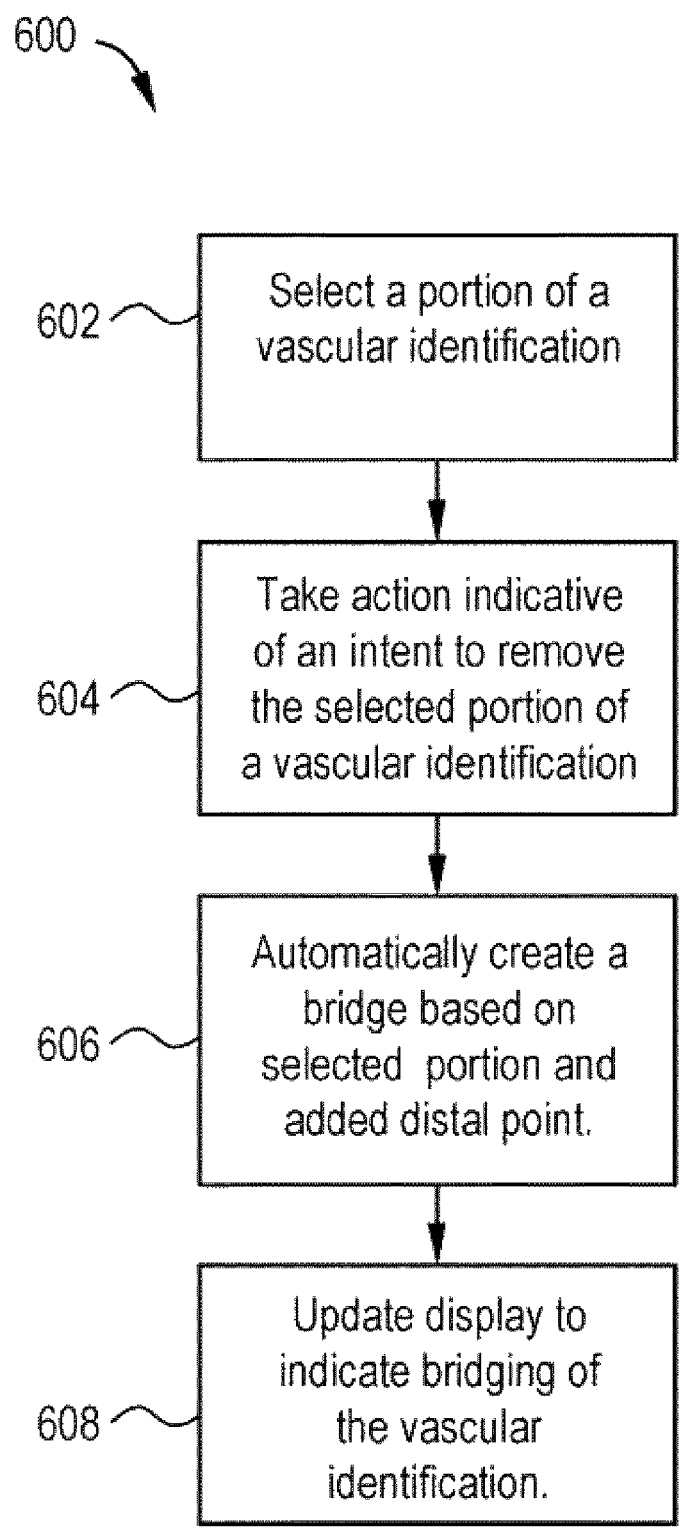
FIG. 6 shows a flowchart of a method for bridging two or more portions of a vascular identification, or two or more vascular identifications, in accordance with an embodiment of the present invention.

FIG. 6 shows a flowchart of a method 600 for bridging two or more portions of a vascular identification, or two or more vascular identifications, in accordance with an embodiment of the present invention. The steps of method 600 may be performed in an alternate order as shown, for example. Furthermore, some steps of method 600 may be omitted, for example. The steps of method may be performed by a computer and/or other processor executing a set of instructions on a computer-readable medium, for example.

At step 602 a portion of a vascular identification may be selected. For example, a user may select a portion of a vascular identification. As another example, a portion of a vascular identification may be selected automatically, as by a computer or a processor, for example. A vascular identification may be selected by a user through a user interface, for example. A user may view a vascular identification and underlying image on a display, for example. A user may employ a user interface to select a portion of a vascular identification, or a marker or annotation corresponding to a portion of a vascular identification. For example, a user may use a mousing device and clicking or otherwise selecting on a relevant portion of a vascular identification, or a marker or annotation corresponding to a portion of a vascular identification. A user may also be able to select multiple portions, for example. An application may recognize the user's actions, and may provide visual feedback to the user indicating that a selection has been made. For example, feedback may include changing a color, contrast, and/or shading of a selected portion of a vascular identification and/or corresponding marker or annotation.

At step 604, action may be taken indicative of an intent to form a bridge. A bridge may be a shape that connects portions of one or more vascular identifications, for example. Bridges may be helpful for connecting various portions of vascular network(s) or identification(s) when imaging may not result in a natural appearing connection. Bridge formation may be invoked in a variety of ways. For example, the entire selected area may be converted to a bridge. Alternately, a portion of the selected area may be converted to a bridge. Alternately, a user may deposit one or more points in a region of a desired bridge. Action indicative of bridging may be similar to types of action discussed previously. For example, such action may include deposition/removal of additional point(s), right clicking, selection from a contextual menu, selection from other menu, selection from a floating window, and/or the like.

At step 606, a bridge based on selected portion and added distal point may be automatically created. The results of automatic bridging may form an iterative vascular identification. A bridging of vascular identification(s) may be information capable of being displayed in two-dimensional, three-dimensional, and or four-dimensional, for example. A bridging of vascular identification(s) may be in the region of seed points from step 604 and/or selected portion(s) from step 602, for example. As previously discussed, the methods and systems behind automatic alteration of vascular identifications may be independent of the imaging modality chosen to generate a radiological image containing a vascular network.

At step 608, a display may be updated to include the bridging of portion(s) of the vascular identification. For example, the display may show bridging of portion(s) of the vascular identification integrated with the original portion of the vascular identification. The display may show bridging in a separate color or in an original color, for example. The display may be updated to show bridging in context with the underlying image, for example. The display may be updated to show more than one simultaneous view, such as axial, sagittal, coronal, and/or three-dimensional views, for example. The display may be updated substantially in real-time, for example, as measured from the time between the previous user interaction and the updating of the display. The display may indicate other feedback in response to actions performed in method 500, such as a text message indicative that an automatic bridging of vascular identification(s) has been performed, for example.

In addition to the iterative methods shown in FIGS. 2-6 and discussed in the corresponding text, various other iterative interactions with a vascular network may be possible. For example, a user may be able to rename annotations and/or markers, for example, or add new annotations and/or markers. As another example, a user may be able to rotate, resize, crop, or otherwise orient a vascular identification in one or more dimensions to form an iterative vascular identification. As another example, a user may be able to alter various colors, shadings, contrasts, or the like that correspond to various aspects of a vascular identification to form an iterative vascular identification. Any such interaction may result in a real-time display of an iterative vascular identification to the user. As discussed above, iterative vascular identifications may not require re-processing or re-identification of unaltered portions of the original vascular identification. For example, a subset for identification may include portions of the new identification that are not substantially similar to the original identification.

As an illustrative example, a user interacting with an application capable of performing methods 100, 200, 300, 400, 500, and/or 600 opens a three-dimensional image of a patient including a vascular network. The three-dimensional image was generated by CT scan. In accordance with method 100, the user places a proximal and distal seed point, and the method 100 automatically identifies a vascular network to form the original vascular identification. At step 108, the user may dynamically interact with the vascular identification in real time. The user, in accordance with method 200 decides to extend a branch of the original identification. At step 202, the user selects the branch to be extended by hovering over the branch and clicking. The branch changes color so the user knows a selection has been made. The user then clicks on a new distal point, at step 204, and at step 206, the application automatically identifies the extension area between the selected branch and the new distal point. The application does not recalculate the original identification, thereby expediting processing. The new iterative vascular identification including both original portions and the extension portions is displayed in real-time back to the user. The user may continue to interact with the iterative vascular identification as discussed in accordance with the various methods above.

In an embodiment, a processor or computer for performing methods 100, 200, 300, 400, 500, and/or 600 may include a computer-readable medium, such as a hard disk, floppy disk, CD, CD-ROM, DVD, compact storage, flash memory and/or other memory. The medium may be in a local processor or computer and/or in a separate system. The medium may include a set of instructions capable of execution by a computer or other processor. The methods described above may be implemented as instructions on the computer-readable medium. For example, the set of instructions may include a reception routine that receives at least one image comprising a vascular network. The reception routine may be similar to information described in conjunction with step 102 of method 100. Additionally, the set of instructions may include a recognition routine that identifying at least one seed point corresponding to said vascular network. The recognition routine may be similar to information described in conjunction with step 104 of method 100. Additionally, the set of instructions may include an identification routine for identifying automatically at least a portion of the vascular network to form an original vascular identification based at least on one seed point. The identification routine may be similar to information described in conjunction with step 106 of method 100. Additionally, the set of instructions may include an interaction routine for allowing user interaction with a portion of the original vascular identification. The interaction routine may be similar to information described in conjunction with step 108 of method 100. In an embodiment, the identification routine also includes elements of method 200. In an embodiment, the identification routine also includes elements of method 300. In an embodiment, the identification routine also includes elements of method 400. In an embodiment, the identification routine also includes elements of method 500. In an embodiment, the identification routine also includes elements of method 600. In an embodiment, the identification routine forms an iterative vascular identification capable of being formed in real time. In an embodiment, the identification routine forms an iterative vascular identification capable of being displayed in real time. In an embodiment, the interaction routine reduces processing by not re-identifying unaltered portions of the original vascular identification.

Thus, embodiments of the present application provide methods and systems that reduce the cost and resource consumption of vascular structure identification. Additionally, embodiments of the present application provide methods and systems that improve the efficiency of vascular structure identification. Moreover, embodiments of the present application provide methods and systems that enable a user's dynamic interaction with vascular structure identification tools in real-time.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. For example, features may be implemented with software, hardware, or a mix thereof. Therefore, it is intended that the invention not be limited to the particular embodiment disclosed, but that the invention will include all embodiments falling within the scope of the appended claims.

The invention claimed is:

1. A method for identifying vascular structure in an image, the method comprising:

receiving, at an image processing subsystem, an image including a vascular network;

identifying, with the image processing subsystem, a first vascular identification and a second vascular identification; and allowing, through a user interface of the image processing subsystem, a dynamic user interaction to form a bridge in a region between the first vascular identification and the second vascular identification, wherein the dynamic user interaction comprises an addition of an intermediate seed point in the region between the first vascular identification and the second vascular identification.

2. The method of claim 1, wherein the dynamic user interaction comprises a selection of at least a portion of the region between the first vascular identification and the second vascular identification.

3. The method of claim 1, further comprising displaying the first vascular identification, the second vascular identification, and the bridge.

4. The method of claim 3, wherein the bridge comprises a color different than a color of the first vascular identification and a color of the second vascular identification.

5. The method of claim 3, wherein the bridge is simultaneously displayed in at least two of an axial view, a sagittal view, or a coronal view.

6. A non-transitory computer readable medium having a set of instructions for execution by a computer, the set of instructions comprising:

a reception routine for receiving, at an image processing subsystem, an image including a vascular network;

an identification routine for identifying, with the image processing subsystem, a first vascular identification and a second vascular identification; and an allowance routine for allowing, through a user interface of the image processing subsystem, a dynamic user interaction to form a bridge in a region between the first vascular identification and the second vascular identification, wherein the dynamic user interaction comprises an addition of an intermediate seed point in the region between the first vascular identification and the second vascular identification.

7. The set of instructions of claim 6, wherein the dynamic user interaction comprises a selection of at least a portion of the region between the first vascular identification and the second vascular identification.

8. The set of instructions of claim 6, further comprising a display routine for displaying the first vascular identification, the second vascular identification, and the bridge.

9. The set of instructions of claim 8, wherein the bridge comprises a color different than a color of the first vascular identification and a color of the second vascular identification.

10. The set of instructions of claim 8, wherein the bridge is simultaneously displayed in at least two of an axial view, a sagittal view, or a coronal view.

* * * * *